US007328428B2

(12) United States Patent
Baugher

(10) Patent No.: US 7,328,428 B2
(45) Date of Patent: Feb. 5, 2008

(54) SYSTEM AND METHOD FOR GENERATING DATA VALIDATION RULES

(75) Inventor: Ernest S. Baugher, Baltimore, MD (US)

(73) Assignee: Trivergent Technologies, Inc., Buda, TX (US)

( * ) Notice: Subject to any disclaimer, the term of this patent is extended or adjusted under 35 U.S.C. 154(b) by 636 days.

(21) Appl. No.: 10/668,718

(22) Filed: Sep. 23, 2003

(65) Prior Publication Data

US 2005/0066263 A1 Mar. 24, 2005

(51) Int. Cl.
*G06F 9/45* (2006.01)
(52) U.S. Cl. .................................... 717/124
(58) Field of Classification Search ............... 717/126, 717/124
See application file for complete search history.

(56) References Cited

U.S. PATENT DOCUMENTS 5,412,756 A    5/1995  Bauman et al.
5,418,756 A *  5/1995  McClure .................. 365/233.5
6,308,178 B1  10/2001  Chang

OTHER PUBLICATIONS

International Search Report, Feb. 23, 2007.
Written Opinion of the International Searching Authority, Feb. 23, 2007.

* cited by examiner

*Primary Examiner*—John Chavis
(74) *Attorney, Agent, or Firm*—Milbank Tweed Hadley & McCLoy LLP

(57) ABSTRACT

A method for generating validation logic executable in a target application in a target platform. The method creates a metarule, creates a target domain attribute, creates a mapping of the metarule to the target domain attribute, and creates target domain attribute validation logic executable in a target application in a target platform based on the metarule, the mapping of the metarule to the target domain attribute, and the target language of the target platform. The method further submits test data, including a value of a target domain attribute, to the target domain attribute validation logic, and produces an actual validation result based on the submitted test data.

76 Claims, 25 Drawing Sheets

| Meta Domains 310 | |
|---|---|
| Domain Name | Description |
| | |
| | |
| | |
| | |
| | |
| | |

Domain 1
Domain 2
.
.
.
Domain N

| Meta Domain Entities 320 | | |
|---|---|---|
| Domain | Entity Name | Description |
| | | |
| | | |
| | | |
| | | |
| | | |

Entity 1
Entity 2
.
.
.
Entity N

| Meta Domain Attributes 330 | | | |
|---|---|---|---|
| Domain | Entity | Attribute Name | Description |
| | | | |
| | | | |
| | | | |
| | | | |
| | | | |

Attribute 1
Attribute 2
.
.
.
Attribute N

| Meta Domain Relationships 340 | | | | |
|---|---|---|---|---|
| Domain | Entity 1 | Entity 2 | Relationship Type | Description |
| | | | | |
| | | | | |
| | | | | |
| | | | | |
| | | | | |

Relationship 1
Relationship 2
.
.
.
Relationship N

FIG 3

| Metarules 410 | | | | | | |
|---|---|---|---|---|---|---|
| Metarule Name | Required | Data Type | Min Length | Max Length | Valid Values | Error Message |
| Metarule 1 | | | | | | |
| Metarule 2 | | | | | | |
| . | | | | | | |
| . | | | | | | |
| . | | | | | | |
| Metarule N | | | | | | |

| Association of Meta Domain Attributes to Metarules 420 | | | |
|---|---|---|---|
| Domain | Entity | Attribute | Metarule |
| Association 1 | | | |
| Association 2 | | | |
| . | | | |
| . | | | |
| . | | | |
| Association N | | | |

FIG 4

| Meta Domain Test Suites 510 ||
|---|---|
| Meta Domain | Test Suite |
| Test Suite 1 | |
| Test Suite 2 | |
| ... | |
| Test Suite N | |

| Meta Domain Tests 520 ||
|---|---|
| Test Suite | Test |
| Test 1 | |
| Test 2 | |
| ... | |
| Test N | |

| Meta Domain Test Values 530 ||||||
|---|---|---|---|---|---|
| Test Suite | Test | Entity | Instance | Attribute | Value |
| Value 1 | | | | | |
| Value 2 | | | | | |
| ... | | | | | |
| Value N | | | | | |

| Meta Domain Expected Violations 540 ||||||
|---|---|---|---|---|---|
| Test Suite | Test | Entity | Instance | Attribute | Metarule |
| Violation 1 | | | | | |
| Violation 2 | | | | | |
| ... | | | | | |
| Violation N | | | | | |

FIG 5

Entity Documentation
    Description of Entity

Attribute 1 Documentation
        Description of Attribute 1
        Validations for Attribute 1
            Validation 1
            Validation 2
            .
            Validation N Attribute 2 Documentation
        Description of Attribute 2
        Validations for Attribute 2
            Validation 1
            Validation 2
            .
            Validation N

.
    .
    .

Attribute N Documentation
        Description of Attribute N
        Validations for Attribute N
            Validation 1
            Validation 2
            .
            Validation N

FIG 6

Java Domains 710

| Domain Name | Description |
|---|---|
| Domain 1 | |
| Domain 2 | |
| ... | |
| Domain N | |

Java Domain Classes 720

| | Domain | Class Name | Description |
|---|---|---|---|
| Class 1 | | | |
| Class 2 | | | |
| ... | | | |
| Class N | | | |

Java Domain Instance Variables 730

| | Domain | Class | Instance Variable | Data Type | Accessor | Description |
|---|---|---|---|---|---|---|
| Instance Variable 1 | | | | | | |
| Instance Variable 2 | | | | | | |
| ... | | | | | | |
| Instance Variable N | | | | | | |

Java Domain Object References 740

| | Domain | Class | Instance Variable | Cardinality | Validate |
|---|---|---|---|---|---|
| Reference 1 | | | | | |
| Reference 2 | | | | | |
| ... | | | | | |
| Reference N | | | | | |

FIG 7

| | Mapping of Meta Domain to Java Domain 810 | | | | | |
|---|---|---|---|---|---|---|
| | Meta Domain | Meta Domain Entity | Meta Domain Attribute | Java Target Domain | Java Target Domain Class | Java Target Domain Instance Variable |
| Mapping 1 | | | | | | |
| Mapping 2 | | | | | | |
| . | | | | | | |
| . | | | | | | |
| . | | | | | | |
| Mapping N | | | | | | |

FIG 8

| Java Domain Test Suites 910 | |
|---|---|
| Java Domain | Test Suite |
| | |
| | |
| | |
| | |
| | |

Test Suite 1
Test Suite 2
.
.
.
Test Suite N

| Java Domain Tests 920 | |
|---|---|
| Test Suite | Test |
| | |
| | |
| | |
| | |
| | |

Test 1
Test 2
.
.
.
Test N

| Java Domain Test Values 930 | | | | | |
|---|---|---|---|---|---|
| Test Suite | Test | Class | Instance | Instance Variable | Value |
| | | | | | |
| | | | | | |
| | | | | | |
| | | | | | |
| | | | | | |

Value 1
Value 2
.
.
.
Value N

| Java Domain Expected Violations 940 | | | | | |
|---|---|---|---|---|---|
| Test Suite | Test | Class | Instance | Instance Variable | Metarule |
| | | | | | |
| | | | | | |
| | | | | | |
| | | | | | |
| | | | | | |

Violation 1
Violation 2
.
.
.
Violation N

FIG 9

Class Documentation
    Description of Class

Instance Variable 1 Documentation
        Description of Instance Variable 1
        Validations for Instance Variable 1
            Validation 1
            Validation 2
            .
            Validation N Instance Variable 2 Documentation
        Description of Instance Variable 2
        Validations for Instance Variable 2
            Validation 1
            Validation 2
            .
            Validation N

.
.
.

Instance Variable N Documentation
        Description of Instance Variable N
        Validations for Instance Variable N
            Validation 1
            Validation 2
            .
            Validation N

FIG 10

| Example 1 Meta Domain 1210 ||
|---|---|
| Domain Name | Description |
| Example 1 Meta Domain | Meta Domain for Example 1. |

| Example 1 Meta Domain Entities 1220 |||
|---|---|---|
| Domain | Entity Name | Description |
| Example 1 Meta Domain | Customer | The customer name and contact information. |

| Example 1 Meta Domain Attributes 1230 ||||
|---|---|---|---|
| Domain | Entity | Attribute Name | Description |
| Example 1 Meta Domain | Customer | Last Name | The last name of the customer. |
| Example 1 Meta Domain | Customer | First Name | The first name of the customer. |
| Example 1 Meta Domain | Customer | Middle Initial | The middle initial of the customer. |
| Example 1 Meta Domain | Customer | Home Phone | The home phone number of the customer. |
| Example 1 Meta Domain | Customer | Work Phone | The work phone number of the customer. |
| Example 1 Meta Domain | Customer | Street Address | The street address of the customer. |
| Example 1 Meta Domain | Customer | City | The city in which the customer resides. |
| Example 1 Meta Domain | Customer | State | The state in which the customer resides. |
| Example 1 Meta Domain | Customer | Zip Code | The zip code in which the customer resides. |

| Example 1 Meta Domain Relationships 1240 |||||
|---|---|---|---|---|
| Domain | Entity 1 | Entity 2 | Relationship Type | Description |
|  |  |  |  |  |

FIG 12

| Example 1 Metarules 1310 ||||||
|---|---|---|---|---|---|
| Metarule Name | Req | Data Type | Min Length | Max Length | Valid Values | Error Message |
| Last Name Rule | Yes | Alpha | 1 | 15 | | is required and cannot be greater that 15 characters in length |
| First Name Rule | Yes | Alpha | 1 | 25 | | is required and cannot be greater that 25 characters in length |
| Phone Rule | No | Numeric | 10 | 10 | | must be composed of 10 digits |
| Required Rule | Yes | | | | | is required |
| Street Address Rule | Yes | Text | 1 | 35 | | is required and cannot be greater that 35 characters in length |
| City Rule | Yes | Text | 1 | 15 | | is required and cannot be greater that 15 characters in length |
| State Rule | Yes | Alpha | 2 | 2 | AK, AL, AR, AZ, CA, CO, CT, DE, FL, GA, HI, LA, IA, ID, IL, IN, KS, KY, MA, MD, ME, MI, MN, MO, MS, MT, NC, ND, NE, NH, NM, NJ, NV, NY, OH, OK, OR, PA, RI, SC, SD, TN, TX, UT, VA, VT, WA, WI, WV, WY | must be a valid two character state code |
| Zip Code Rule | Yes | Numeric | 5 | 5 | | is required and must be composed of 5 digits |

| Association of Example 1 Meta Domain Attributes to Metarules 1320 ||||
|---|---|---|---|
| Domain | Entity | Attribute | Metarule |
| Example 1 Meta Domain | Customer | Last Name | Last Name Rule |
| Example 1 Meta Domain | Customer | First Name | First Name Rule |
| Example 1 Meta Domain | Customer | Home Phone | Phone Rule |
| Example 1 Meta Domain | Customer | Home Phone | Required Rule |
| Example 1 Meta Domain | Customer | Work Phone | Phone Rule |
| Example 1 Meta Domain | Customer | Street Address | Street Address Rule |
| Example 1 Meta Domain | Customer | City | City Rule |
| Example 1 Meta Domain | Customer | State | State Rule |
| Example 1 Meta Domain | Customer | Zip Code | Zip Code Rule |

FIG 13

| Example 1 Java Domain 1410 ||
|---|---|
| Domain Name | Description |
| Example 1 Java Domain | The Java target domain for Example 1. |

| Example 1 Java Domain Classes 1420 |||
|---|---|---|
| Domain | Class Name | Description |
| Example 1 Java Domain | Person | Person object contains a person's name, address, and telephone numbers. |
| Example 1 Java Domain | Address | Address object contains an address of a Person. |

| Example 1 Java Domain Instance Variables 1430 ||||||
|---|---|---|---|---|---|
| Domain | Class | Instance Variable Name | Data Type | Accessor | Description |
| Example 1 Java Domain | Person | lastName | String | getLastName | The last name of the person. |
| Example 1 Java Domain | Person | firstName | String | getFirstName | The first name of the person. |
| Example 1 Java Domain | Person | middleInitial | String | getMiddleInitial | The middle initial of the person. |
| Example 1 Java Domain | Person | homePhone | String | getHomePhone | The home phone number of the person. |
| Example 1 Java Domain | Person | workPhone | String | getWorkPhone | The work phone number of the person. |
| Example 1 Java Domain | Person | homeAddress | Address | getHomeAddress | The home address of the person. |
| Example 1 Java Domain | Address | street | String | getStreet | The street address. |
| Example 1 Java Domain | Address | city | String | getCity | The city. |
| Example 1 Java Domain | Address | state | String | getState | The state code. |
| Example 1 Java Domain | Address | zip | String | getZip | The 5 digit zip code. |

| Example 1 Java Domain Object References 1440 |||||
|---|---|---|---|---|
| Domain | Class | Instance Variable | Cardinality | Validate |
| Example 1 Java Domain | Person | homeAddress | One | Yes |

FIG 14

| Mapping of Example 1 Meta Domain to Java Domain 1510 |||||||
|---|---|---|---|---|---|
| Meta Domain | Meta Domain Entity | Meta Domain Attribute | Target Domain | Target Domain Class | Target Domain Instance Variable |
| Example 1 Meta Domain | Customer | Last Name | Example 1 Java Domain | Person | lastName |
| Example 1 Meta Domain | Customer | First Name | Example 1 Java Domain | Person | firstName |
| Example 1 Meta Domain | Customer | Middle Initial | Example 1 Java Domain | Person | middleInitial |
| Example 1 Meta Domain | Customer | Home Phone | Example 1 Java Domain | Person | homePhone |
| Example 1 Meta Domain | Customer | Work Phone | Example 1 Java Domain | Person | workPhone |
| Example 1 Meta Domain | Customer | Street Address | Example 1 Java Domain | Address | street |
| Example 1 Meta Domain | Customer | City | Example 1 Java Domain | Address | city |
| Example 1 Meta Domain | Customer | State | Example 1 Java Domain | Address | state |
| Example 1 Meta Domain | Customer | Zip Code | Example 1 Java Domain | Address | zip |

FIG 15

Example 1 Meta Domain Test Suites 1810

| Meta Domain | Test Suite |
|---|---|
| Example 1 Meta Domain | Example 1 Test Suite |

Example 1 Meta Domain Tests 1820

| Test Suite | Test |
|---|---|
| Example 1 Test Suite | Test 1 |
| Example 1 Test Suite | Test 2 |

Example 1 Meta Domain Test Values 1830

| Test Suite | Test | Entity | Instance | Attribute | Value |
|---|---|---|---|---|---|
| Example 1 Test Suite | Test 1 | Customer | Customer 1 | Last Name | Doe |
| Example 1 Test Suite | Test 1 | Customer | Customer 1 | First Name | John |
| Example 1 Test Suite | Test 1 | Customer | Customer 1 | Middle Initial | T |
| Example 1 Test Suite | Test 1 | Customer | Customer 1 | Home Phone | 8005551212 |
| Example 1 Test Suite | Test 1 | Customer | Customer 1 | Work Phone | 8005552222 |
| Example 1 Test Suite | Test 1 | Customer | Customer 1 | Street Address | 123 Main Street |
| Example 1 Test Suite | Test 1 | Customer | Customer 1 | City | Peoria |
| Example 1 Test Suite | Test 1 | Customer | Customer 1 | State | IL |
| Example 1 Test Suite | Test 1 | Customer | Customer 1 | Zip Code | 99999 |
| Example 1 Test Suite | Test 2 | Customer | Customer 1 | Last Name | Doe |
| Example 1 Test Suite | Test 2 | Customer | Customer 1 | First Name | John |
| Example 1 Test Suite | Test 2 | Customer | Customer 1 | Middle Initial | T |
| Example 1 Test Suite | Test 2 | Customer | Customer 1 | Home Phone | 8005551212 |
| Example 1 Test Suite | Test 2 | Customer | Customer 1 | Work Phone | 800555222 |
| Example 1 Test Suite | Test 2 | Customer | Customer 1 | Street Address | 123 Main Street |
| Example 1 Test Suite | Test 2 | Customer | Customer 1 | City | Peoria |
| Example 1 Test Suite | Test 2 | Customer | Customer 1 | State | IH |
| Example 1 Test Suite | Test 2 | Customer | Customer 1 | Zip Code | |

Example 1 Meta Domain Expected Violations 1840

| Test Suite | Test | Entity | Instance | Attribute | Metarule |
|---|---|---|---|---|---|
| Example 1 Test Suite | Test 2 | Customer | Customer1 | Work Phone | Phone Rule |
| Example 1 Test Suite | Test 2 | Customer | Customer1 | State | State Rule |
| Example 1 Test Suite | Test 2 | Customer | Customer1 | Zip Code | Zip Code Rule |

FIG 18

Example 1 Java Domain Test Suites 1910

| Domain | Test Suite |
| --- | --- |
| Example 1 Java Domain | Example 1 Test Suite |

Example 1 Java Domain Tests 1920

| Test Suite | Test |
| --- | --- |
| Example 1 Test Suite | Test 1 |
| Example 1 Test Suite | Test 2 |

Example 1 Java Domain Test Values 1930

| Test Suite | Test | Class | Instance | Instance Variable | Value |
| --- | --- | --- | --- | --- | --- |
| Example 1 Test Suite | Test 1 | Person | Customer 1 | lastName | Doe |
| Example 1 Test Suite | Test 1 | Person | Customer 1 | firstName | John |
| Example 1 Test Suite | Test 1 | Person | Customer 1 | middleInitial | T |
| Example 1 Test Suite | Test 1 | Person | Customer 1 | homePhone | 8005551212 |
| Example 1 Test Suite | Test 1 | Person | Customer 1 | workPhone | 8005552222 |
| Example 1 Test Suite | Test 1 | Person | Customer 1 | homeAddress | Home Address 1 |
| Example 1 Test Suite | Test 1 | Address | Home Address 1 | street | 123 Main Street |
| Example 1 Test Suite | Test 1 | Address | Home Address 1 | city | Peoria |
| Example 1 Test Suite | Test 1 | Address | Home Address 1 | state | IL |
| Example 1 Test Suite | Test 1 | Address | Home Address 1 | zip | 99999 |
| Example 1 Test Suite | Test 2 | Person | Customer 1 | lastName | Doe |
| Example 1 Test Suite | Test 2 | Person | Customer 1 | firstName | John |
| Example 1 Test Suite | Test 2 | Person | Customer 1 | middleInitial | T |
| Example 1 Test Suite | Test 2 | Person | Customer 1 | homePhone | 8005551212 |
| Example 1 Test Suite | Test 2 | Person | Customer 1 | workPhone | 800555222 |
| Example 1 Test Suite | Test 2 | Person | Customer 1 | homeAddress | Home Address 1 |
| Example 1 Test Suite | Test 2 | Address | Home Address 1 | street | 123 Main Street |
| Example 1 Test Suite | Test 2 | Address | Home Address 1 | city | Peoria |
| Example 1 Test Suite | Test 2 | Address | Home Address 1 | state | IH |
| Example 1 Test Suite | Test 2 | Address | Home Address 1 | zip | |

Example 1 Java Domain Expected Violations 1940

| Test Suite | Test | Class | Instance | Instance Variable | Metarule |
| --- | --- | --- | --- | --- | --- |
| Example 1 Test Suite | Test 2 | Person | Customer 1 | workPhone | Phone Rule |
| Example 1 Test Suite | Test 2 | Address | Home Address 1 | state | State Rule |
| Example 1 Test Suite | Test 2 | Address | Home Address 1 | zip | Zip Code Rule |

FIG 19

Example 1 Meta Domain
Description: Meta Domain for Example 1.

Entity: Customer
    Description: The customer name and contact information.

Attribute: Last Name
        Description: The last name of the customer.
        Validations:
            - Is required.
            - Cannot be greater than 25 characters in length.

Attribute: First Name
        Description: The first name of the customer.
        Validations:
            - Is required.
            - Cannot be greater than 15 characters in length.

Attribute: Middle Initial
        Description: The middle initial of the customer.
        Validations: None Attribute: Home Phone
        Description: The home phone number of the customer.
        Validations:
            - Is required.
            - Must be numeric.
            - Must be 10 characters in length.

Attribute: Work Phone
        Description: The work phone number of the customer.
        Validations:
            - Must be numeric.
            - Must be 10 characters in length.

Attribute: Street Address
        Description: The street address of the customer.
        Validations:
            - Is required.
            - Cannot be greater than 35 characters in length.

Attribute: City
        Description: The city in which the customer resides.
        Validations:
            - Is required.
            - Cannot be greater than 15 characters in length.

Attribute: State
        Description: The state in which the customer resides.
        Validations:
            - Is required.
            - Must be one of the following valid values:
                AK, AL, AR, AZ, CA, CO, CT, DE, FL, GA, HI, LA, IA, ID, IL, IN, KS, KY, MA, MD,
                ME, MI, MN, MO, MS, MT, NC, ND, NE, NH, NM, NJ, NV, NY, OH, OK, OR, PA, RI,
                SC, SD, TN, TX, UT, VA, VT, WA, WI, WV, WY Attribute: Zip Code
        Description: The zip code in which the customer resides.
        Validations:
            - Is required.
            - Must be numeric.
            - Must be 5 characters in length

FIG 22

Java Target Domain for Example 1
Description: The Java target domain for Example 1.
Class: Person
    Description: Person object contains a person's name, address, and telephone numbers.

Instance Variable: lastName
        Description: The last name of the person.
        Validations:
            - Is required.
            - Cannot be greater than 25 characters in length.

Instance Variable: firstName
        Description: The first name of the person.
        Validations:
            - Is required.
            - Cannot be greater than 15 characters in length.

Instance Variable: middleInitial
        Description: The middle initial of the person.
        Validations: None Instance Variable: homePhone
        Description: The home phone number of the person.
        Validations:
            - Is required.
            - Must be numeric.
            - Must be 10 characters in length.

Instance Variable: workPhone
        Description: The work phone number of the person.
        Validations:
            - Must be numeric.
            - Must be 10 characters in length.

Instance Variable: homeAddress
        Description: The home address of the person.
        Validations: See the Address class.
Class: Address
    Description: Address object contains an address of a Person.

Instance Variable: street
        Description: The street address.
        Validations:
            - Is required.
            - Cannot be greater than 35 characters in length.

Instance Variable: city
        Description: The city.
        Validations:
            - Is required.
            - Cannot be greater than 15 characters in length.

Instance Variable: state
        Description: The state code.
        Validations:
            - Is required.
            - Must be one of the following valid values:
                AK, AL, AR, AZ, CA, CO, CT, DE, FL, GA, HI, LA, IA, ID, IL, IN, KS, KY, MA, MD,
                ME, MI, MN, MO, MS, MT, NC, ND, NE, NH, NM, NJ, NV, NY, OH, OK, OR, PA, RI, SC,
                SD, TN, TX, UT, VA, VT, WA, WI, WV, WY Instance Variable: zip
        Description: The 5 digit zip code.
        Validations:
            - Is required.
            - Must be numeric.
            - Must be 5 characters in length

FIG 23

SYSTEM AND METHOD FOR GENERATING DATA VALIDATION RULES

BACKGROUND OF THE INVENTION

When businesses receive new data for their computer systems, they typically must validate that data before it can be processed. For example, when a bank receives a new loan application, the information contained in the application is examined and determined to be legitimate and complete before the application is processed. If the application fails validation, processing may halt and the data in the application may be corrected before processing can proceed.

There are many different types of validation. Validation logic may apply to a single data item. The validation logic can determine if a data value is the correct type (e.g. Numeric, alphanumeric, text, etc.) And the correct length. The validation logic can also determine if the data value is a member of a specified set of values (e.g. Ea valid two character state code) or if it falls within a specified range of values. Alternatively, validation logic may involve multiple data items and the validity of the relationships between them. For example, validation logic might dictate that a loan amount cannot be greater than ten times the amount of equity. Validation logic can become arbitrarily complex. Some validations may be conditional (i.e. The application of the validation is dependent upon the successful execution of a conditional statement). For example, some loan validation rules might only apply to certain types of loans. The concept of validation encompasses any logic that examines one or more data items and determines a Boolean outcome of true or false.

The implementation of validation logic has a number of problems associated with it. First, the creation of validation logic is a time consuming and costly endeavor. Many systems contain hundreds or even thousands of validation rules. In current application development, the validation logic typically may not be created or tested independently from the application; i.e. The application must be executed in order to execute the validation logic. This provides a very inefficient means to create and test validation logic. In addition to the cost of creating validation logic, it is also difficult and costly to maintain validation logic. Since it is usually not well segregated from the other application logic, it cannot be managed and maintained as a separate IT asset. Over time it typically becomes harder and more costly to maintain due to inadequate documentation, staff turnover, etc. The implementation and maintenance of validation logic also suffers from a lack of business visibility into the process. Validation logic typically may be defined or approved by business users, yet there are few or no tools that make it possible for business users to participate directly in rule creation, testing, or maintenance. Their participation is usually limited to reviewing documentation that is not generated directly from the implementation of the validation logic. Such documentation is costly to maintain and over time often diverges from the implementation due to lack of diligence or resources.

Once created, validation logic may be difficult to reuse inside other applications within the enterprise and between enterprises. In the past, many large enterprises have relied on mainframes to be the sole domicile of their business logic. However, the internet has required the use of new application platforms such as J2EE and .NET, making it difficult for an enterprise to maintain their business logic on a single platform. Consequently, validation logic is often implemented and duplicated on multiple platforms within the enterprise. It would be desirable to create and manage validation logic for multiple platforms from a single point of control. In addition to the current difficulties associated with reusing validation logic within an enterprise, it may be difficult to share validation logic with external enterprises. The rise of E-Commerce has increased the amount of B2B interactions and the amount of data that is transmitted electronically between enterprises. These interactions are giving rise to new industry standards for exchanging information. These standards often include validation rules as well as data layout specifications. Yet each enterprise is responsible for its own implementation of the validation logic. This creates inefficiency, redundancy of effort, and costs associated with reconciling different implementations between enterprises. Therefore, it may be difficult for an enterprise to share its validation logic with other enterprises.

Finally, the current implementations of validation logic may not mitigate the cost associated with the manual investigation and correction of invalid data. When data fails validation it often may require manual intervention to investigate and correct the data (i.e. An individual has to research the cause of the failure and either correct the data or the validation rules). This cost may be either borne by the company receiving the data, the company sending the data, or both.

SUMMARY OF THE INVENTION

The invention of the present disclosure features a method for generating validation logic executable in a target application in a target platform including creating a metarule, and creating target domain metarule validation logic based on the metarule and a target language of the target platform.

In another aspect, the invention of the present disclosure features a method including creating a metarule, creating a target domain attribute, creating a mapping of the metarule to the target domain attribute, and creating target domain attribute validation logic executable in a target application in a target platform based on the metarule, the mapping of the metarule to the target domain attribute, and the target language of the target platform.

In another aspect, the invention of the present disclosure features a method including creating a metarule, creating a meat domain attribute, associating the metarule with the meat domain attribute, creating a target domain attribute, mapping the meat domain attribute to the target domain attribute, and creating target domain attribute validation logic executable in a target application in a target platform based on the metarule, the meat domain attribute, the target domain attribute, the mapping between the meat domain attribute and the target domain attribute, the metarule associated with the meat domain attribute, and the target language of the target platform.

In another aspect, the invention of the present disclosure features a system including a meat domain editor for creating a meat domain attribute and an associated metarule, a target domain editor for creating a target domain attribute and for mapping the meat domain attribute to the target domain attribute, and a target domain attribute validation function generator for generating a target domain attribute validation function based on the meat domain attribute, the associated metarule, the target domain attribute, the mapping of the meat domain attribute to the target domain attribute, and the target language of the target platform.

BRIEF DESCRIPTION OF THE DRAWINGS

FIG. 3 is a diagram illustrating the information contained in meat domains according to one aspect of the system of the present disclosure.

FIG. 4 is a diagram illustrating the information contained in mettles and the association of mettles with meat domain attributes according to one aspect of the system of the present disclosure.

FIG. 5 is a diagram illustrating the information contained in meat domain test suites according to one aspect of the system of the present disclosure.

FIG. 6 is a diagram illustrating the information contained in meat domain documentation according to one aspect of the system of the present disclosure.

FIG. 7 is a diagram illustrating the information contained in a Java target domain according to one aspect of the system of the present disclosure.

FIG. 8 is a diagram illustrating the information contained in a mapping of a meat domain to a Java target domain according to one aspect of the system of the present disclosure.

FIG. 9 is a diagram illustrating the information contained in a Java target domain test suite according to one aspect of the system of the present disclosure.

FIG. 10 is a diagram illustrating the information contained in Java target domain documentation according to one aspect of the system of the present disclosure.

FIG. 12 is a diagram illustrating an example meat domain according to one aspect of the system of the present disclosure.

FIG. 13 is a diagram illustrating mettles for the example meat domain according to one aspect of the system of the present disclosure.

FIG. 14 is a diagram illustrating an example Java target domain according to one aspect of the system of the present disclosure.

FIG. 15 is a diagram illustrating a mapping between the example meat domain and the example Java domain according to one aspect of the system of the present disclosure.

FIG. 18 is a diagram illustrating a test suite for the example meat domain according to one aspect of the system of the present disclosure.

FIG. 19 is a diagram illustrating a test suite for the example Java domain according to one aspect of the system of the present disclosure.

FIG. 22 is a diagram illustrating the documentation generated for the example meat domain according to one aspect of the system of the present disclosure.

FIG. 23 is a diagram illustrating the documentation generated for the example Java domain according to one aspect of the system of the present disclosure.

DETAILED DESCRIPTION OF THE INVENTION

The system of the present disclosure is based on the concept of mettles. A metarule may be an extension of the concept of metadata (i.e. Data about data) and may be defined in a high level representation rather than in a specific programming language. Since mettles may not defined in a programming language they may not actually be executed in production. Metarules may be used to derive functionally equivalent rules implemented in a specific programming language and executed in a production platform.

Figure 1:
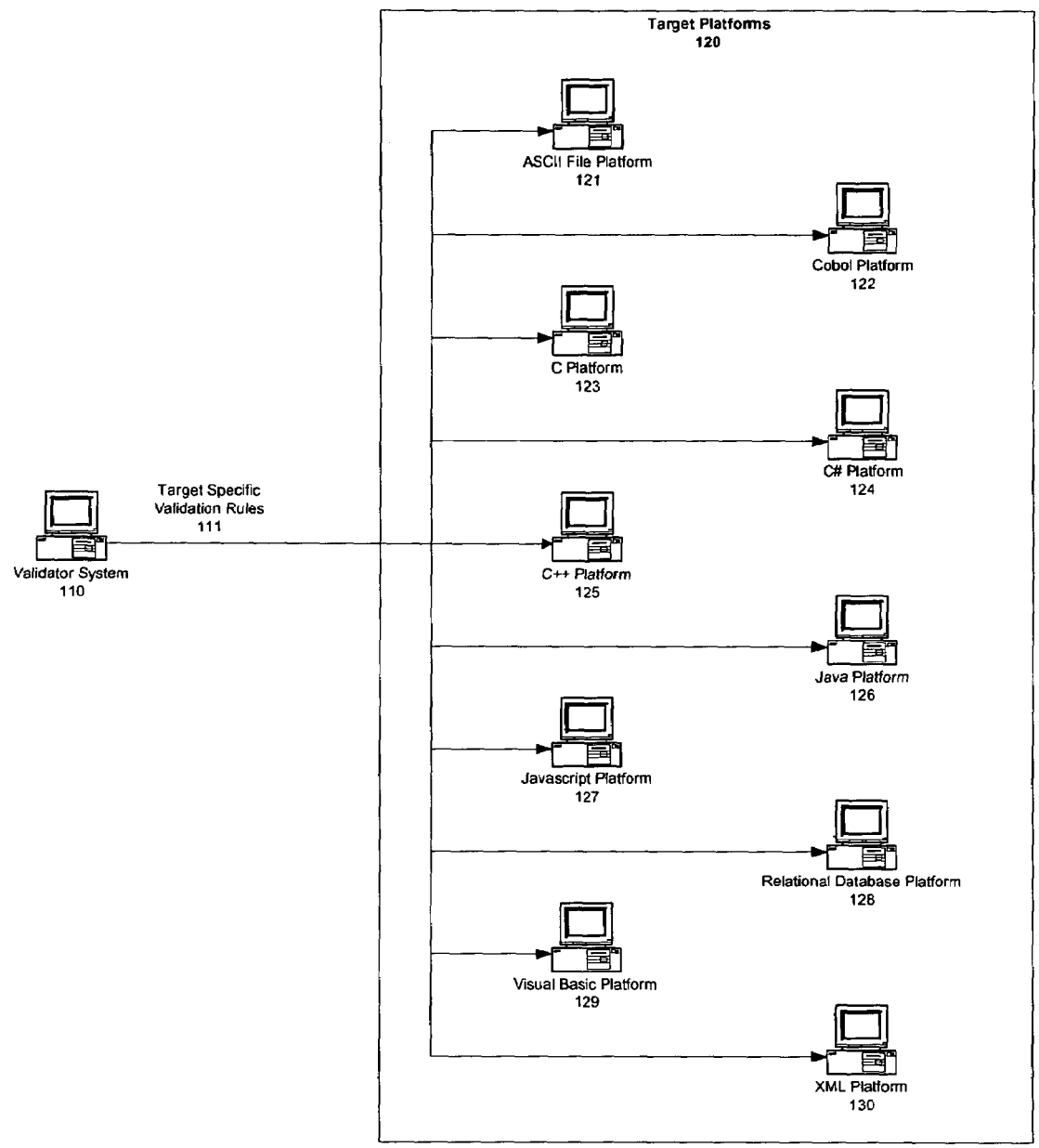
FIG. 1 is a diagram showing an overview of a system according to one aspect of the system of the present disclosure.

FIG. 1 shows the Validate System 110, according to one aspect of the present disclosure, and multiple Target Platforms 120. The Validate System 110 is capable of generating Target Specific Validation Rules 111 for target applications associated with the Target Platforms 120. The Target Specific Validation Rules 111 are included in the target applications at development time. The target applications may execute on handheld computers, laptop, personal computers, workstations, or mainframes.

Each Target Platform 120 encompasses numerous potential target applications. Target Platforms may include, for example, the following programming languages: COBOL Platform 122, C Platform 123, C# Platform 124, C++ Platform 125, Java Platform 126, and Visual Basic Platform 129. In such cases, a target application may be any application written in the programming language of the platform that utilizes Target Specific Validation Rules 111 to validate the data structures in the application. For example, a Java target application may use Target Specific Validation Rules 111 to validate the Java objects contained in the application.

Other Target Platforms 120, such as the ASCII File Platform 121 and the XML Platform 130, pertain to data representation. In these cases, a target application may be any application that processes such data and utilizes Target Specific Validation Rules 111 to validate its contents. Note that in this context, target applications are not constrained to one particular programming language. For example, a Visual Basic application that processes an XML file and a Java application that processes an XML file may both be target applications within the XML Platform. The Java script Platform 127 pertains to HTML pages rendered inside web browsers, in which case a target application may be any set of HTML pages that utilize Target Specific Validation Rules 111 in Java script to validate the data entered in the HTML pages.

The Relational Database Platform 128 refers to relational database applications, in which case a target application may be an instance of a relational database that uses Target Specific Validation Rules 111 in SQL to validate the data contained in the database.

The Target Platforms 120 depicted are meant to be illustrative rather than exhaustive. Target Platforms for other existing programming languages and technologies, as well as for future programming languages and technologies, may be supported by the architecture.

Data in the system may be organized by attribute, entity, and domain. An attribute may be an individual data element, and an entity may be a group of one or more related attributes. For example, a Customer entity might contain attributes for Street Address, City, State, and Zip Code. A domain may be a group of entities and their associated attributes. A meat domain is an abstract group of entities and attributes that are not defined in any particular target application. Alternatively, a target domain is a group of entities and attributes that have concrete representations in a particular target application, for example, they may represent classes and instance variables in a Java program, tables and columns in a relational database, etc.

Validation logic may be embodied in mettles that are typically defined on the attributes and entities of a meat domain. Metarules may be, for example, Boolean logic constructs designed to determine the validity of an attribute or attributes. In other words, a validation metarule may be any logic that evaluates the value of one or more attributes and returns true or false. Aspects of the system of the present disclosure may utilize GUI tools, proprietary 4GLs, or a combination of both to define mettles.

There are many different types of validation mettles. Atomic mettles may analyze the value of a specific attribute in isolation from the other attributes of the meat domain. For example, atomic mettles may be capable of performing the following types of validations:

Required Validation—verifying that the attribute has a value.

Length Validation—verifying that the length of the attribute's value is within a defined minimum and maximum length.

Data Type Validation—verifying that the characters included in the value of the attribute belong to a defined set (e.g. The data type is numeric, the data type is alphanumeric, etc.).

Range Validation—verifying that the value of the attribute is within a defined range of values (e.g. Ea numeric value may be required to be between 0 and 100).

Enumeration Validation—verifying that the value of the attribute is a member of a defined set of values (e.g. Ea set of two character state codes).

Regular Expression Validation—verifying that the value of the attribute conforms to a specified regular expression.

Figure 2:
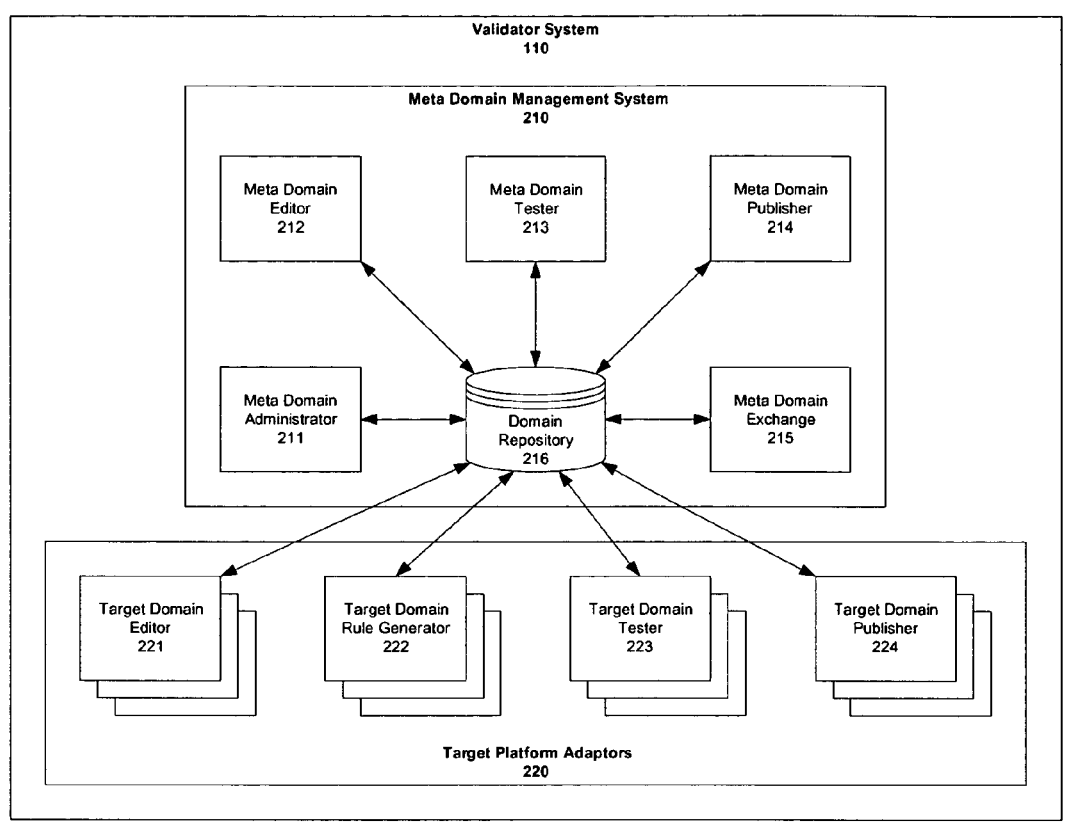
FIG. 2 is a diagram illustrating the basic architecture of a system according to one aspect of the system of the present disclosure.

Cross-attribute mettles may validate the relationship between the values of two or more attributes (e.g. is the value of "Attribute A" less than the value of "Attribute B"). Aggregation mettles may validate the aggregate value of an attribute for a collection of entities (e.g. The total of the values for an attribute cannot exceed a specified amount, or the average value of an attribute must exceed some specified amount). Conditional mettles may perform a validation when a defined set of preconditions are met (e.g. if "Attribute A" has a particular value and "Attribute B" has a particular value then "Attribute C" is required). Many mettles may fall into one or more of the above categories. However, since validation mettles can be arbitrarily complex, some mettles may defy any classification scheme. FIG. 2 illustrates the basic architecture of the Validate System 110 according to one aspect of the system of the present disclosure. The Meat Domain Management System 210 may be responsible for the creation and management of meat domains and their associated mettles. The Meat Domain Management System 210 includes the following functional components: Meat Domain Administrator 211, Meat Domain Editor 212, Meat Domain Tester 213, Meat Domain Publisher 214, Meat Domain Exchange 215, and Domain Repository 216.

The Meat Domain Administrator 211 is responsible for authentication, authorization, and multi-user access. Authentication identifies users and verifies that they are permitted to use the Meat Domain Management System 210. Authorization verifies that users have the necessary privileges to perform the various functions of the Meat Domain Management System 210. Multi-user access manages the potential resource conflicts arising from multiple users accessing the system at the same time.

The Meat Domain Editor 212 is responsible for the creation, modification, and deletion of meat domains and their associated entities, attributes, and entity relationships. The Meat Domain Editor 212 is also responsible for the creation, modification, and deletion of mettles using proprietary GUI tools and/or a 4GL. The Meat Domain Editor 212 is responsible for saving and retrieving meat domains and their associated mettles in cooperation with the Domain Repository 216. The Meat Domain Editor 212 also allows for the ad hoc testing of individual mettles and the immediate reporting of the results. These tests serve as an aid in the creation and modification of mettles.

FIG. 3 shows the information contained in a meat domain according to one aspect of the system of the present disclosure. For each meat domain, the Meat Domains table 310 defines the name of the meat domain and the description of the meat domain. For each entity, the Meat Domain Entities table 320 defines the name of the domain containing the entity, the name of the entity, and the description of the entity. For each attribute, the Meat Domain Attributes table 330 defines the name of the domain and entity containing the attribute, the name of the attribute, and the description of the attribute. The Meat Domain Relationships table 340 describes the relationships between entities in a meat domain. In one aspect of the system of the present disclosure, for each relationship, the table defines the two entities involved, a description of the relationship, and the type of relationship (e.g. one-to-one, one-to-many, many-to-many).

FIG. 4 shows the information contained in mettles according to one aspect of the system of the present disclosure. For each metarule, the Metarules table 410 defines the name of the metarule, various validation parameters used to validate the value of attribute(s) associated with the metarule, and an error message to display when the attribute fails validation. The validation parameters depicted in the Metarules table 410 are: whether the attribute is required ('Required'), the data type of the attribute ('Data Type'), the minimum length of the attribute ('Min Length'), the maximum length of the attribute ('Max Length'), and the valid values of the attribute ('Valid Values'). The validation parameters in the Metarules table 410 represent one aspect of the system of the present disclosure; other aspects of the system of the present disclosure may contain different validation parameters. The Association of Meat Domain Attributes to Metarules table 420 associates attributes to mettles. Each row associates the attribute that is uniquely identified by the names in the domain, entity, and attribute columns with the metarule named in the metarule column. Metarules are reusable, and the same metarule can be associated with more than one attribute.

The Meat Domain Tester 213 is responsible for the creation, modification, deletion, and execution of tests for a particular meat domain. Tests are grouped together into test suites. Each test includes data values for the attributes of an entity or entities, and a specification of the expected results. The Meat Domain Tester 213 is capable of executing test suites and reporting the results of the test suite execution. The Meat Domain Tester 213 is also responsible for saving and retrieving test suites and their results in cooperation with the Domain Repository 216.

FIG. 5 shows the information contained in a meat domain test suite according to one aspect of the system of the present disclosure. The Meat Domain Test Suites table 510 contains the name of the test suite and the meat domain on which the test suite is defined. The Meat Domain Tests table 520 enumerates the tests contained in the test suite. A test may be associated with more than one test suite. The Meat Domain Test Values table 530 defines the values for the attributes involved in the tests. A test involves one or more related entities. Note, however, that a particular entity may have multiple instances involved in the test. For example, a Customer entity may have multiple addresses based on an Address entity. One instance of the Address entity might be used for a home address while another instance of the Address entity might be used for a shipping address. Thus each row in the Meat Domain Test Values table 530 defines the value for an attribute of a particular instance of an entity participating in a specified test. The Meat Domain Expected Violations table 540 defines the expected results for a test. A violation is a metarule that failed (i.e. returned false) due to an invalid test value. Each test may produce zero, one, or many violations depending upon the validity of the test values. Each row in the Meat Domain Expected Violations table 540 identifies an attribute involved in a test and an associated metarule that is expected to fail based upon the test value defined for the attribute.

The Meat Domain Publisher 214 is responsible for the creation of documentation about a meat domain and its associated mettles. It is also responsible for saving and retrieving meat domain documentation in cooperation with the Domain Repository 216. The meat domain documentation may be made available in a number of formats, for example, Microsoft Word documents, PDF documents, and HTML pages.

FIG. 6 illustrates a possible structure of documentation for the meat domain according to one aspect of the system of the present disclosure. For each entity in the meat domain, the description of the entity is presented followed by the documentation for the attributes contained in the entity. For each attribute, the description of the attribute may be presented followed by a description of the validations associated with the attribute. The descriptions of the validations can be constructed using the error messages of the mettles associated with the attribute.

The Meat Domain Exchange 215 is responsible for exporting meat domains and their associated mettles to external systems. It is also responsible for importing meat domains and their associated mettles from external systems. In one aspect of the system of the present disclosure, the import/export of mettles may be accomplished, for example, using an XML representation of the mettles. Other aspects of the system of the present disclosure may use other representations.

The Domain Repository 216 is responsible for the persistent storage of meat domains, mettles, target domains, and the mappings between meat domains and target domains. It is also responsible for the persistent storage of the entities, attributes, tests, test suites, and documentation associated with domains. Different aspects of the system of the present disclosure may implement the Domain Repository 216 using different persistent storage mechanisms (e.g. XML file, relational database, etc.). The Domain Repository 216 provides an interface to the other components of the system that insulates them from the specific implementation of the Domain Repository 216.

The Validate System 110 is capable of supporting a broad range of Target Platforms 120, for example, ASCII File Platform 121, COBOL Platform 122, C Platform 123, C# Platform 124, C++ Platform 125, Java Platform 126, Java script Platform 127, Relational Database Platform 128, Visual Basic Platform 129, and XML Platform 130. A Target Platform Adaptor 220 allows the system to generate Target Specific Validation Rules 111 from the mettles. Target Platform Adaptors 220 may include the following functional components: Target Domain Editor 221, Target Domain Rule Generator 222, Target Domain Tester 223, and Target Domain Publisher 224.

The Target Domain Editor 221 is responsible for the creation, modification, and deletion of the entities and attributes in the target domain. The entities and attributes may be created manually using the Target Domain Editor 221. Alternatively, depending upon the platform, the Target Domain Editor 221 may be able to import the entity and attribute definitions directly from the target application. For example, a Target Domain Editor 221 for a relational database may read the data dictionary of a database and utilize information about the database tables and columns to create target domain entities and attributes respectively. Other Target Domain Editors 221 may parse source code to gather information that may be used to create target domain entities and attributes. For example, the classes and instance variables of a Java application may be used to create target domain entities and attributes. Multiple target applications may reside on the same computer system, each having its own target domain.

The Target Domain Editor 221 is also responsible for mapping the entities and attributes in the meat domain to the entities and attributes in the target domain. The entities and attributes contained in the target application may differ from the definition of entities and attributes in the meat domain. For example, in the meat domain address attributes such as Street Address, City, State, and Zip Code may be defined on a Customer entity. In the target application, however, the address attributes may be defined on an Address entity and the Customer entity may reference the Address entity rather than defining the address attributes directly. Consequently, it may be necessary to map the entities and attributes defined in the meat domain to the entities and attributes in the target domain.

The Target Domain Editor 221 allows for the creation, modification, and deletion of target domain mettles. All of the validation rules used in a target application may not be available as mettles in the meat domain. The target application may even have entities and attributes for which there are no corresponding entities and attributes in the meat domain. In order to compensate for what might be lacking in the meat domain and its associated mettles, the Target Domain Editor 221 allows mettles to be associated directly with the attributes of the target domain. These mettles which are associated directly with the target domain are knows as target domain mettles. These target domain mettles may not be defined in the programming language of the target application, but are defined using the same GUI tools and/or 4GL as the meat domain mettles. One distinction between target domain mettles and meat domain mettles may be that target domain mettles are associated with the entities and attributes of the target domain rather than being associated with the entities and attributes of the meat domain.

The Target Domain Editor 221 also allows for the creation, modification, and deletion of rulesets. A ruleset is a subset of the mettles available in the target domain. Different functionalities within an application may require different validation logic. Since all validation rules may not be suitable for all purposes, it is necessary to have the ability to group mettles into sets that can be managed, generated, and executed together.

Finally, the Target Domain Editor 221 is responsible for saving and retrieving target domains, target rules, and rulesets in cooperation with the Domain Repository 216.

FIG. 7 shows the information contained in a target Java domain according to one aspect of the system of the present disclosure. For each Java target domain, the Java Domains table 710 defines the name of the target domain and the description of the domain. For each class, the Java Domain Classes table 720 defines the name of the domain containing the class, the name of the class, and the description of the class. For each instance variable, the Java Domain Instance Variables table 730 defines the name of the domain and class containing the instance variable, the name of the instance variable, the data type of the instance variable, the accessor method for obtaining the value of the instance variable, and the description of the instance variable. For instance variables that reference other object(s), the data type field defines the class of the referenced object(s). The Java Domain Object References table 740 extends the definition of those instance variables that reference other objects. The table defines the cardinality of the reference (i.e. whether the instance variable references a single object or multiple objects). It also defines whether or not the referenced object should be validated when the object containing the reference is validated.

FIG. 8 shows the mapping of a meat domain to a Java target domain according to one aspect of the system of the present disclosure. Each row of the Mapping of Meat Domain to Java Domain table 810 maps a meat domain attribute to a Java target domain instance variable.

The Target Domain Rule Generator 222 uses information contained in the meat domain, mettles, target domain, and target mapping to generate Target Specific Validation Rules 111 that are capable of executing within the environment of the target application. The Target Specific Validation Rules 111 are functionally equivalent to the mettles. The Target Domain Rule Generator 222 may generate validation rules for all the mettles or for a defined ruleset. The Target Specific Validation Rules 111 provide a developer working on the target application the ability to validate a target entity or entities and receive a list of validation violations. The Target Specific Validation Rules 111 generated by the Validate System 110 also allow for augmentation with validation rules written by a developer in the programming language of the target application.

The Target Domain Tester 223 is responsible for the creation, modification, deletion, and execution of tests for a particular target domain. Tests are grouped together into test suites. Each test contains data values for the attributes of an entity or entities, and a specification of the expected results. The Target Domain Tester 223 is capable of executing test suites and reporting the results of the test suite execution. It is also capable of using the Target Mapping to convert meat domain tests and test suites into target domain tests and test suites. The Target Domain Tester 223 is also responsible for saving and retrieving test suites and their results in cooperation with the Domain Repository 216.

FIG. 9 shows the information contained in a Java target domain test suite according to one aspect of the system of the present disclosure. The Java Domain Test Suites table 910 contains the name of the test suite and the Java domain on which the test suite is defined. The Java Domain Tests table 920 enumerates the tests contained in the test suite. Note that a test may be associated with more than one test suite. The Java Domain Test Values table 930 defines the values for the instance variables involved in the tests. A test may involve one or more related classes. Note, however, that a particular class may have multiple instances involved in the test. For example, a Customer instance may reference multiple address instances based on an Address class. One instance of the Address class might be used for a home address while another instance of the Address class might be used for a shipping address. Thus each row in the Java Domain Test Values table 930 defines the value for an instance variable of a particular instance of a class participating in a specified test. The Java Domain Expected Violations table 940 defines the expected results for a test. A violation is a metarule that failed (i.e. returned false) due to an invalid test value. Each test may produce zero, one, or many violations depending upon the validity of the test values. Each row in the Java Domain Expected Violations table 940 identifies an instance variable involved in a test and an associated metarule that is expected to fail based upon the test value defined for the instance variable.

The Target Domain Publisher 224 is responsible for the creation of documentation about a target domain and its associated validation rules. It is also responsible for saving and retrieving target domain documentation in cooperation with the Domain Repository 216, The target domain documentation may be made available in several formats, including but not limited to Microsoft Word documents, PDF documents, and HTML pages.

FIG. 10 illustrates a possible structure of documentation for a Java target domain according to one aspect of the system of the present disclosure. For each class in the target domain, the description of the class may be presented followed by the documentation for the instance variables contained in the class. For each instance variable, the description of the instance variable may be presented followed by descriptions of the validations associated with the instance variable. The descriptions of the validations may be constructed using the error messages of the mettles associated with the attribute.

Creation of Validation Rules

Figure 11:
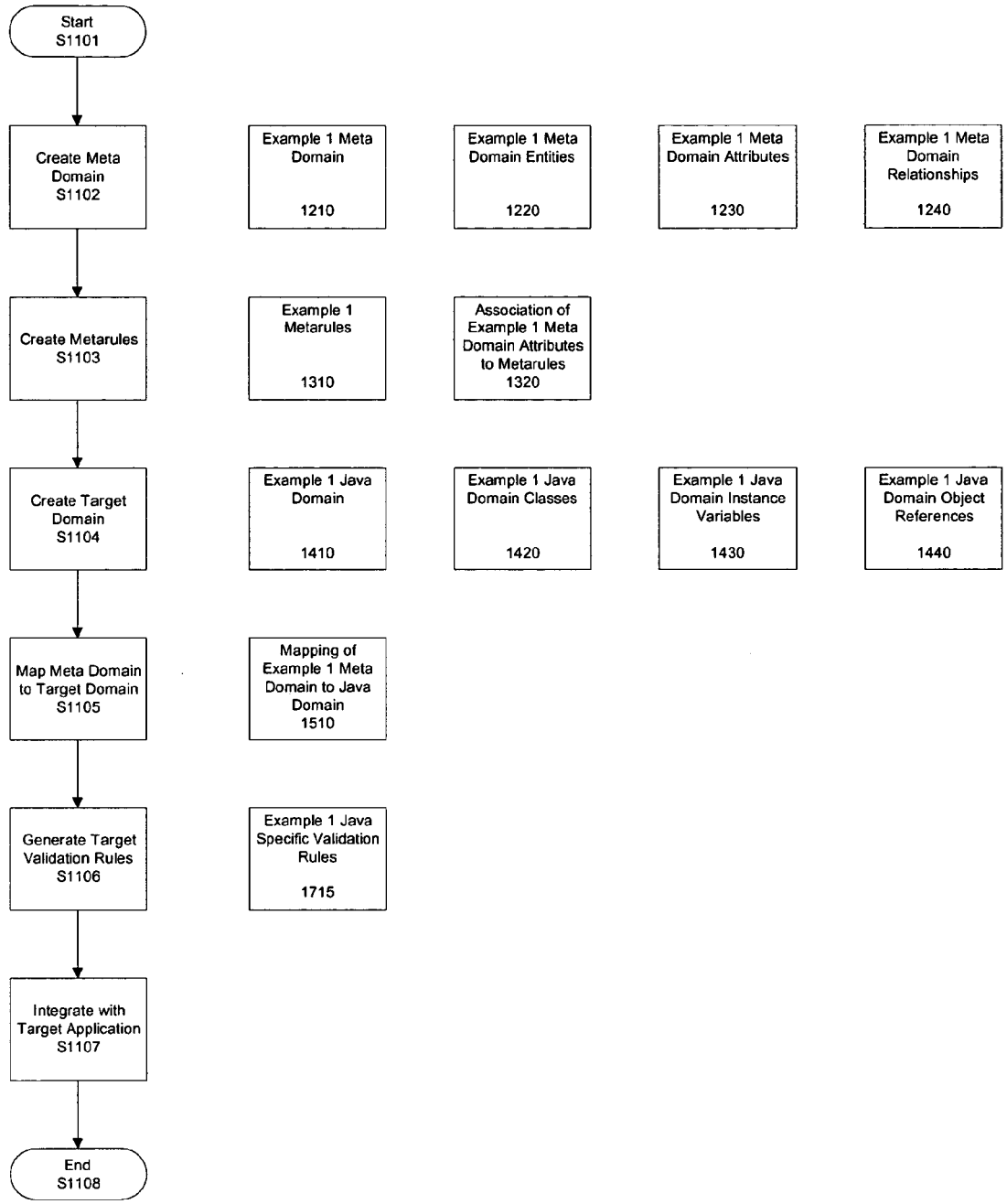
FIG. 11 is a diagram illustrating a generic process flow for the creation of validation rules according to one aspect of the system of the present disclosure.

A process for creating validation rules according to one aspect of the system of the present disclosure is illustrated in FIG. 11. The artifacts which may be created are shown to the right of the step that creates them. This process will be explored below. This example is for the purpose of illustrating the concepts embodied in the system of the present disclosure. It represents one aspect of the system of the present disclosure. Many other more complex aspects of the system of the present disclosure are possible.

The ordering of the steps in the process flow represents one aspect of the system of the present disclosure as there is flexibility in the order in which steps may be executed. In one example, a user may create a target domain before creating the mettles. In another example, a user may complete the steps shown and then repeatedly return to add more mettles and regenerate the target validation rules.

In the example shown in FIG. 11, the first step in creating validation rules is for a user to manually create a meat domain, which may include entities and their associated attributes, using the Meat Domain Editor 212 (Step S1102). The meat domain may not be created with the target domain(s) in mind, and it may be that one or more of the target domains may not even be envisioned at the time the meat domain is created.

FIG. 12 displays an example meat domain defined in the Example 1 Meat Domain table 1210 according to one aspect of the system of the present disclosure. The Example 1 Meat Domain has a single entity, Customer, defined in the Example 1 Meat Domain Entities table 1220. The Customer entity has nine attributes defined in the Example 1 Meat Domain Attributes table 1230: Last Name, First Name, Middle Initial, Home Phone, Work Phone, Street Address, City, State, and Zip Code. The user defines a name and a description for each domain, entity, and attribute. Since, in this example, there is only one entity, the Example 1 Meat Domain Relationships table 1240 has no entries.

After the meat domain is created, the user manually creates mettles using the Meat Domain Editor 212 (Step S1103). FIG. 13 displays a representation of mettles created using the Meat Domain Editor 212. The Example 1 Metarules table 1310 depicts eight mettles: Last Name Rule, First Name Rule, Phone Rule, Required Rule, Street Address Rule, City Rule, State Rule, and Zip Code Rule. Each metarule contains data or logic specific to the type of metarule. In addition, each metarule contains an error message to be displayed when the validation fails.

The mettles are defined on the attributes of the meat domain. The Association of Example 1 Meat Domain Attributes to Metarules table 1320 shows the association of the mettles to the attributes in the meat domain. The relationship between mettles and attributes is many-to-many. A metarule can be associated with more than one attribute (e.g. Ea metarule can be created for one attribute and reused for other attributes). For example, the Phone Rule is associated with both the Home Phone attribute and the Work Phone attribute. Similarly, an attribute can have zero, one, or any number of mettles associated with it. In the example shown in FIG. 13, the Middle Initial attribute has no mettles associated with it, while the Home Phone attribute is associated with both the Phone Rule and the Required Rule.

After the mettles are created, the user may identify a target application and create a target domain for the application using the Target Domain Editor 221 (Step S1104). The target domain may include concepts that correspond to the entity and attribute concepts of the meat domain. For example, if the target application is a relational database, then the tables and columns of the relational database may represent entities and attributes in the target domain respectively. If the target application is a Java program, then the classes and instance variables of the Java program may represent entities and attributes in the target domain. The entities and attributes in the target domain may have names and descriptions identical to the entities and attributes in the meat domain. In addition, the target domain entities and attributes may contain other types of information specific to a particular target domain.

The user may use the Target Domain Editor 221 to manually create a target domain by inputting all the target domain entities, attributes, and related information. In some cases, however, the Target Domain Editor 221 may be able to programmatically create the target domain using information obtained from the target application (e.g. reading the information contained in the data dictionary of a relational database, parsing the source code of a target application, etc.).

FIG. 14 shows an example target domain containing the Person and Address classes of a target Java application according to one aspect of the system of the present disclosure. The Example 1 Java Domain is defined in the Example 1 Java Domain table 1410. The classes making up the target domain, Person and Address, are defined in the Example 1 Java Domain Entities table 1420. The instance variables contained in the classes are defined in the Example 1 Java Domain Instance Variables table 1430. The Address class contains the instance variables street, city, state, and zip. The Person class contains the instance variables lastName, firstName, middleInitial, homePhone, workPhone, and homeAddress (a reference to an object of the Address class). Each instance variable in the target domain has a name, data type, accessor method name, and description. The data type for the homeAddress instance variable is Address since it is a reference to an object of the Address class. The Example 1 Java Domain Object References table 1440 has additional information about the homeAddress instance variable. The table defines the cardinality of the reference, one, and whether or not the referenced object should be validated along with the Person object, yes.

The entities and attributes in the target domain may not correspond one-to-one with the entities and attributes in the meat domain. After the target domain is created, the meat domain may be mapped to the target domain (i.e. The attributes in the meat domain may be associated with attributes in the target domain). This mapping may be performed manually by the user using the Target Domain Editor 221 (Step S1105). Note that not every attribute in the meat domain may be mapped to an attribute in the target domain. Similarly, not every attribute in the target domain may have a mapping from an attribute in the meat domain. In other words, the attributes in the meat domain and the attributes in the target domain may not have a one-to-one correspondence.

FIG. 15 shows the mapping of the Example 1 meat domain to the Example 1 Java domain according to one aspect of the system of the present disclosure. Note that the homeAddress instance variable in the Person class does not have a mapping from the meat domain since no such relationship exists in the meat domain.

Figure 16:
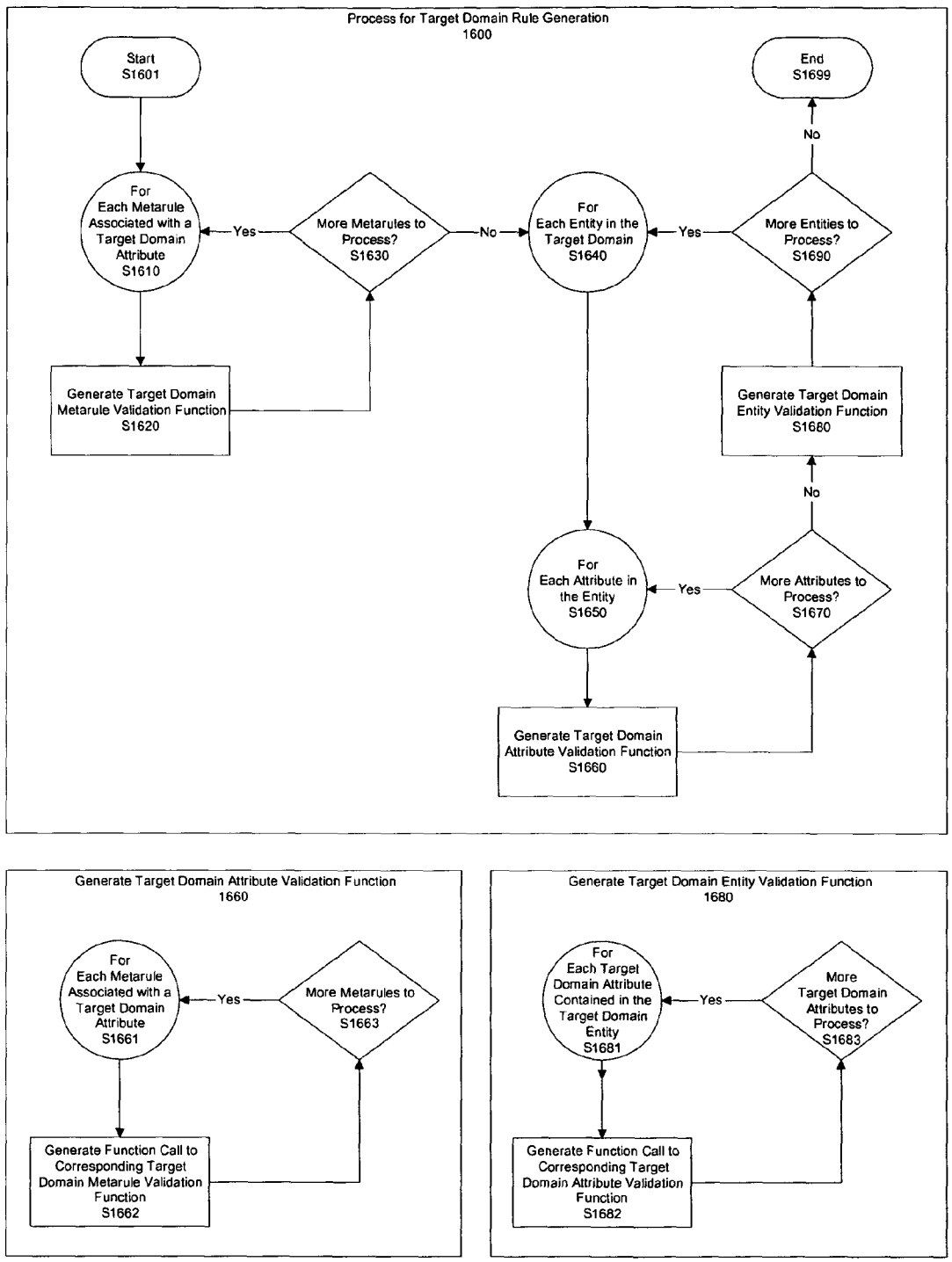
FIG. 16 is a diagram illustrating the process for generating target validation rules according to one aspect of the system of the present disclosure.

Once the target mapping is complete, the Target Domain Rule Generator 222 is used to generate the validation rules using the information contained in the meat domain, mettles, and target mapping (Step S1106). FIG. 16 illustrates the basic process flow for rule generation according to one aspect of the system of the present disclosure 1600. First, each metarule is examined to determine if it is associated with a target domain attribute (Step S1610). A metarule is associated with a target domain attribute if it is associated with a meat domain attribute that is mapped to a target domain attribute or if it is associated directly with a target domain attribute. For each metarule associated with a target domain attribute, a target domain metarule validation function is generated that contains the logic for that metarule (Step S1620). The target domain metarule validation function takes the value of a target domain attribute as an argument and returns a validation violation if the value is not valid. Once logic is generated for each applicable metarule, each entity in the target domain is examined (Step S1640). For each attribute contained in the entity (Step S1650), a target domain attribute validation function may be generated (Step S1660). A target domain attribute validation function may take an attribute value as an argument and may return a data structure containing the validation violations for the attribute if the value is not valid. Once the target domain attribute validation functions are generated, a target domain entity validation function may be generated for the entity (Step S1680). A target domain entity validation function may take an entity as an argument and may return a data structure containing the validation violations for the entity if the entity contains data that is not valid.

The process for generating a target domain attribute validation function 1660 may involve generating a function call to the corresponding metarule validation function for each metarule associated with the target domain attribute (Steps S1661-S1663). These function calls invoke the metarule validation functions that were previously generated, passing the attribute's value as an argument and placing any returned violations into a data structure that is returned by the target domain attribute validation function. The process for generating a target domain entity validation function 1680 may involve generating a function call to the corresponding target domain attribute validation function for each attribute contained in the entity (Steps S1681-S1683). These function calls invoke the target domain attribute validation functions that were previously generated, passing the attribute's value as an argument and placing any returned violations into a data structure that is returned by the target domain entity validation function.

Figure 17:
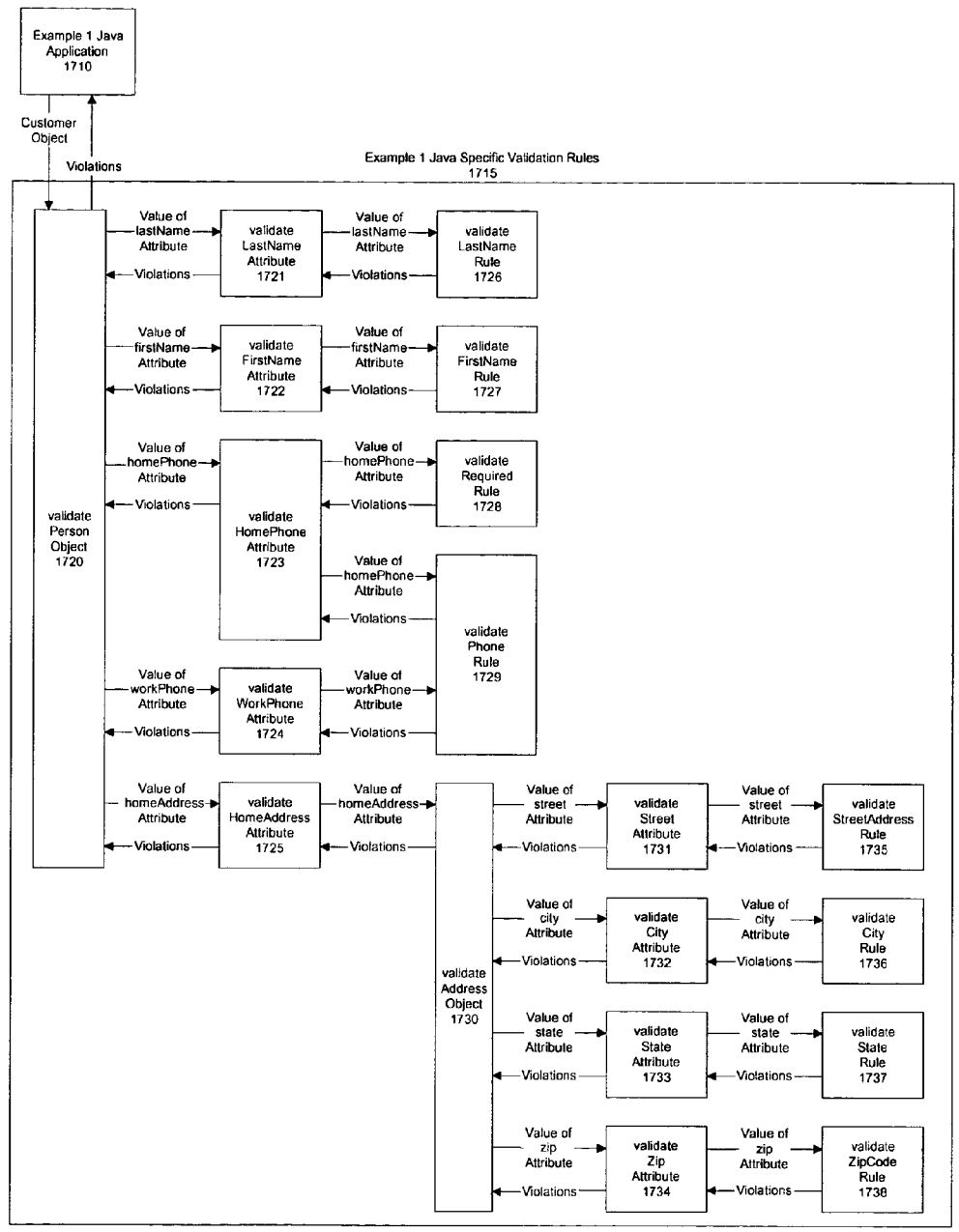
FIG. 17 is a diagram illustrating the structure and execution sequence of the validation rules generated for the example Java domain according to one aspect of the system of the present disclosure.

FIG. 17 shows the Example 1 Java Specific Validation Rules 1715 that were generated by the Target Domain Rule Generator 222. Each box represents a validation function. The metarule validation functions generated for the mettles are validateLastNameRule 1726, validateFirstNameRule 1727, validateRequiredRule 1728, validatePhoneRule 1729, validateStreetAddressRule 1735, validateCityRule 1736, validateStateRule 1737, and validateZipCodeRule 1738. The target domain attribute validation functions generated for the target domain attributes are validateLastNameAttribute 1721, validateFirstNameAttribute 1722, validateHomePhoneAttribute 1723, validateWorkPhoneAttribute 1724, validateHomeAddressAttribute 1725, validateStreetAttribute 1731, validateCityAttribute 1732, validateStateAttribute 1733, and validateZipAttribute 1734. The target domain entity validation functions generated for the target domain entities are validatePersonObject 1720 and validateAddressObject 1730. The lines indicate the calling sequence or flow of execution of the validation. For example, the validatePersonObject function 1720 first calls the validateLastNameAttribute function 1721, passing the value of the lastName instance variable as an argument and receiving any violations as the return value. Note that since the Home Phone attribute in the meat domain has two mettles associated with it, the Phone Rule and the Required Rule, the validateHomePhoneAttribute function 1723 calls two different metarule validation functions for the homePhone instance variable, validateRequiredRule 1728 and validatePhoneRule 1729. Also note that since the homeAddress instance variable is an object reference to an Address object and the value of the validate column in the Example 1 Java Domain References table 1440 is yes, the Person object is responsible for validating the Address object referenced by its homeAddress instance variable. Therefore the validateHomeAddressAttribute function 1725 invokes the validateAddressObject function 1730 to validate its Address object. The validateAddressObject function 1730 is responsible for validating the instance variables contained in the Address object and returning a collection of violations to the validateHomeAddressAttribute function 1725. Finally, note that there is no target domain attribute validation function for the middleInitial instance variable since there are no mettles associated with this attribute.

In Step S1107 the system integrates the Java validations rules into the rest of the Java application. Given a customer object in need of validation, the Example 1 Java Application 1710 makes a function call to validatePerson 1720, passing the customer object as an argument and receiving a collection of violations as a return value.

Creation of Tests

Test suites contain one or more tests. Each test defines values for the attributes of one or more related entities and the expected results of the test. Meat domain test suites and tests are created using the Meat Domain Tester 213. Target domain test suites and tests are created using the Target Domain Tester 223.

FIG. 18 illustrates a test suite for the Example 1 meat domain. The Example 1 Test Suite is defined in the Example 1 Meat Domain Test Suites table 1810. This test suite contains two tests, Test 1 and Test 2, which are defined in the Example 1 Meat Domain Tests table 1820. The data for the two tests are defined in the Example 1 Meat Domain Test Values table 1830. Note that since all the data values defined for Test 1 are valid, the Example 1 Meat Domain Expected Violations table 1840 contains no violations for Test 1. Test 2, on the other hand, contains invalid data values for Work Phone, State, and Zip Code. Hence the Example 1 Meat Domain Expected Violations table 1840 contains violations for the Phone Rule, State Rule, and Zip Code Rule. A test is successful when the violations returned match the expected violations. A test that returns no errors is only successful if all of the test values in the test are valid.

FIG. 19 illustrates a test suite for the Example 1 Java domain. The Example 1 Test Suite is defined in the Example 1 Java Domain Test Suites table 1910. This test suite contains two tests, Test 1 and Test 2, which are defined in the Example 1 Java Domain Tests table 1920. The data for the two tests are defined in the Example 1 Java Domain Test Values table 1930. Note that in both tests, the homeAddress instance variable refers to the Address 1 instance of Address. Furthermore, note that since all the data values defined for Test 1 are valid, the Example 1 Java Domain Expected Violations table 1940 contains no violations for Test 1. Test 2, on the other hand, contains invalid data values for workphone, state, and zip. Hence the Example 1 Java Domain Expected Violations table 1940 contains violations for the Phone Rule, State Rule, and Zip Code Rule. A test is successful when the violations returned match the expected violations. A test that returns no violations is only successful if all of the test values in the test are valid.

Figure 20:
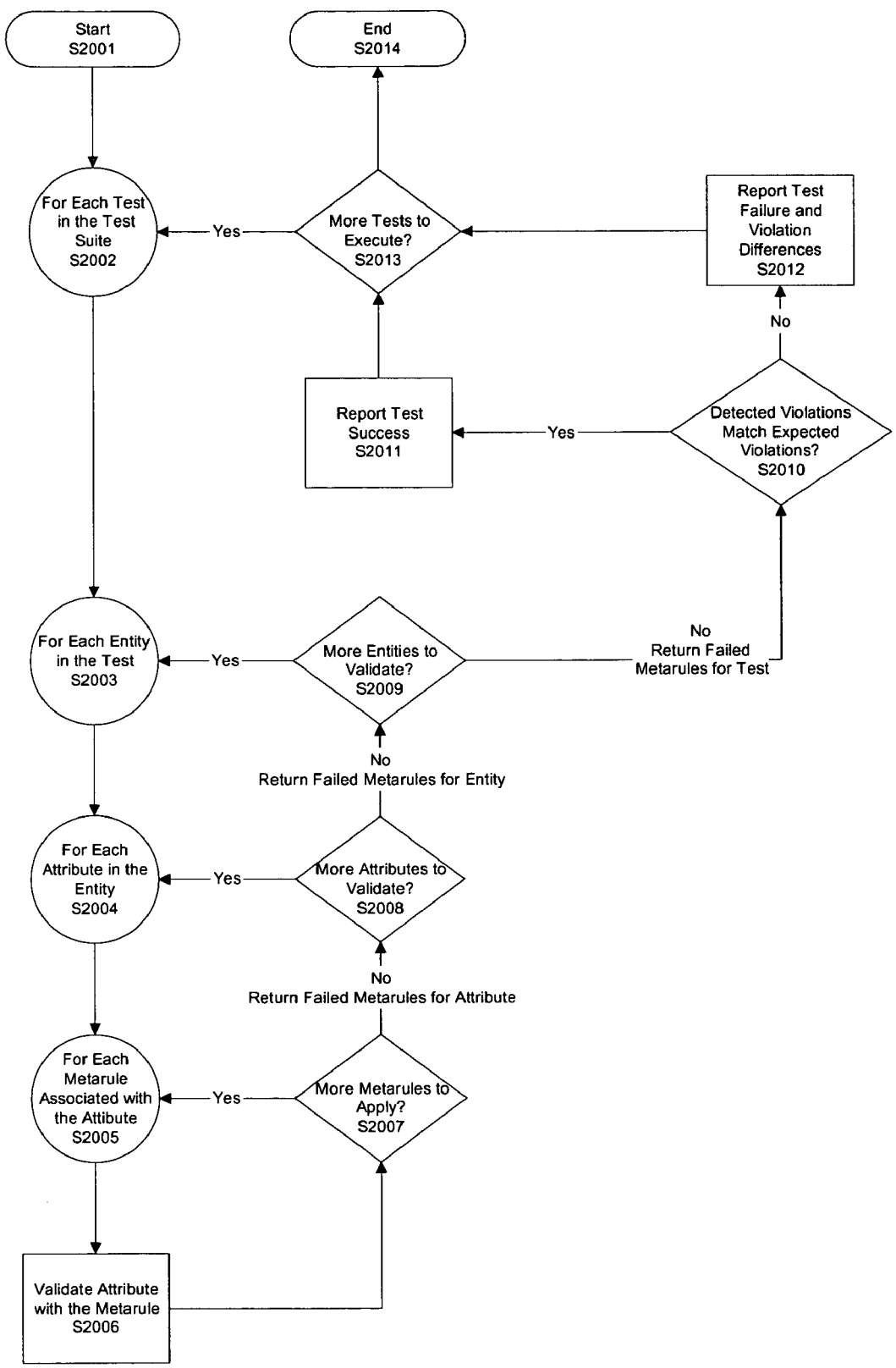
FIG. 20 is a diagram illustrating the process for executing test suites according to one aspect of the system of the present disclosure.

FIG. 20 is a diagram illustrating the process for executing test suites. Each test in the test suite is executed in succession (Steps S2002-S2013). Each entity in the test is validated (Steps S2003-S2009) by validating its attributes (Steps S2004-S2008). Each attribute has its test value validated by the mettles associated with the attribute (Steps S2005-S2007). All of the violations detected by Step S2006 (i.e. The mettles that fail) are ultimately returned to Step S2010 once the test is complete. The detected violations are compared to the expected violations (Steps S2010). If the detected violations match the expected violations, then the success of the test is reported (Step S2011). Otherwise, test failure is reported along with the differences between the detected violations and the expected violations (Step S2012).

Creation of Documentation

Figure 21:
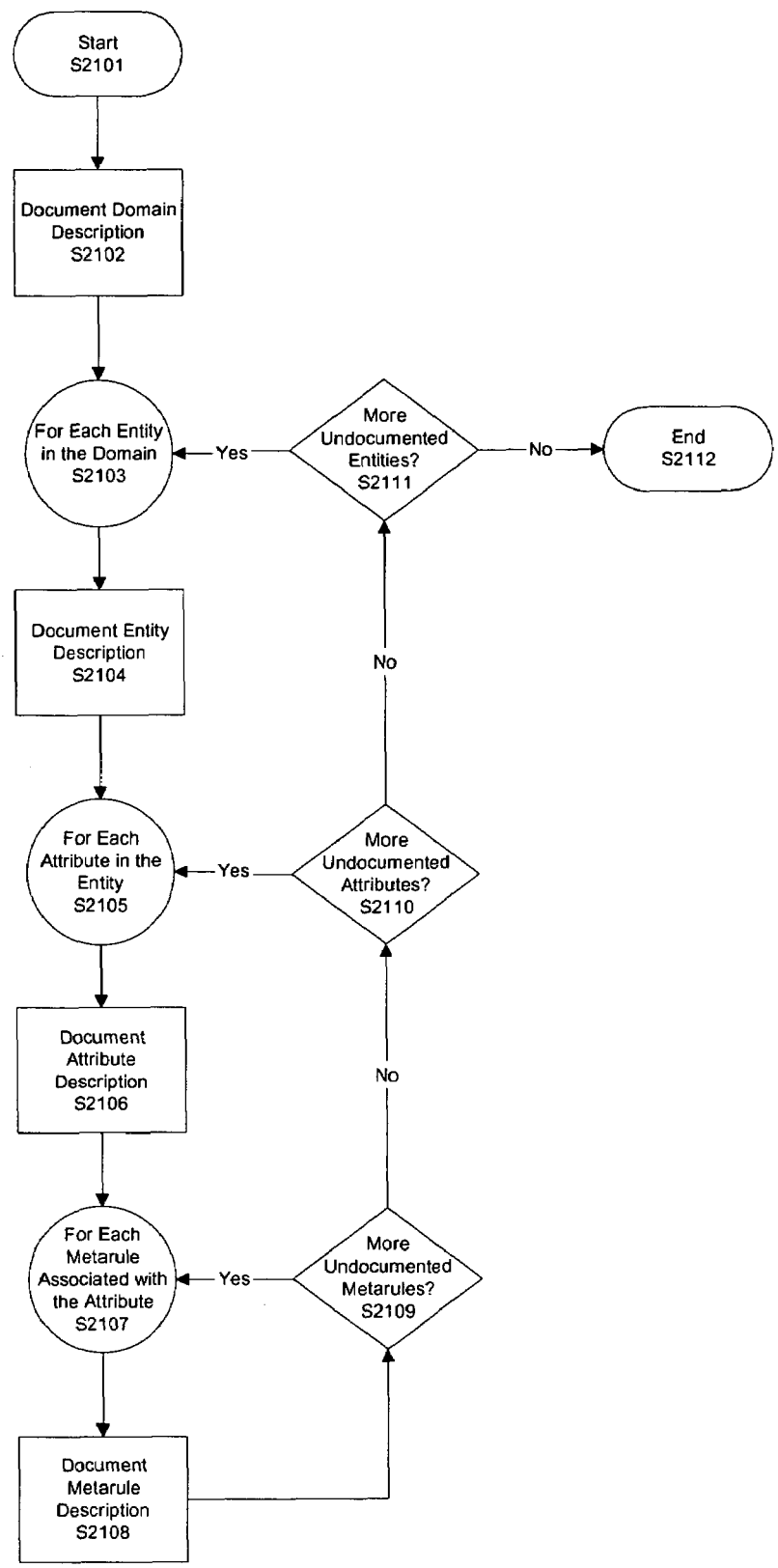
FIG. 21 is a diagram illustrating the process for generating documentation according to one aspect of the system of the present disclosure.

Documentation for a meat domain is created using the Meat Domain Publisher 214. Documentation for a target domain is generated using a Target Domain Publisher 224. The process flow for generating documentation is the same regardless of the domain (i.e. meat domain or target domain). FIG. 21 illustrates the basic process for creating documentation for a domain according to one aspect of the system of the present disclosure. First, the description of the domain is documented (Step S2102). Next, documentation is generated for each entity in the domain (Steps S2103-S2111). For a given entity, the description of the entity is documented (Step S2104). Then each attribute in the entity is documented (Steps S2105-S2110). For a given attribute, the documentation begins with the description of the attribute (Step S2106) followed by documentation for each metarule associated with the attribute (Steps S2107-S2109) according to one aspect of the system of the present disclosure. FIG. 22 displays sample documentation generated for the Example 1 meat domain. FIG. 23 displays sample documentation generated for the Example 1 Java domain according to one aspect of the system of the present disclosure.

EXAMPLE

Figure 24:
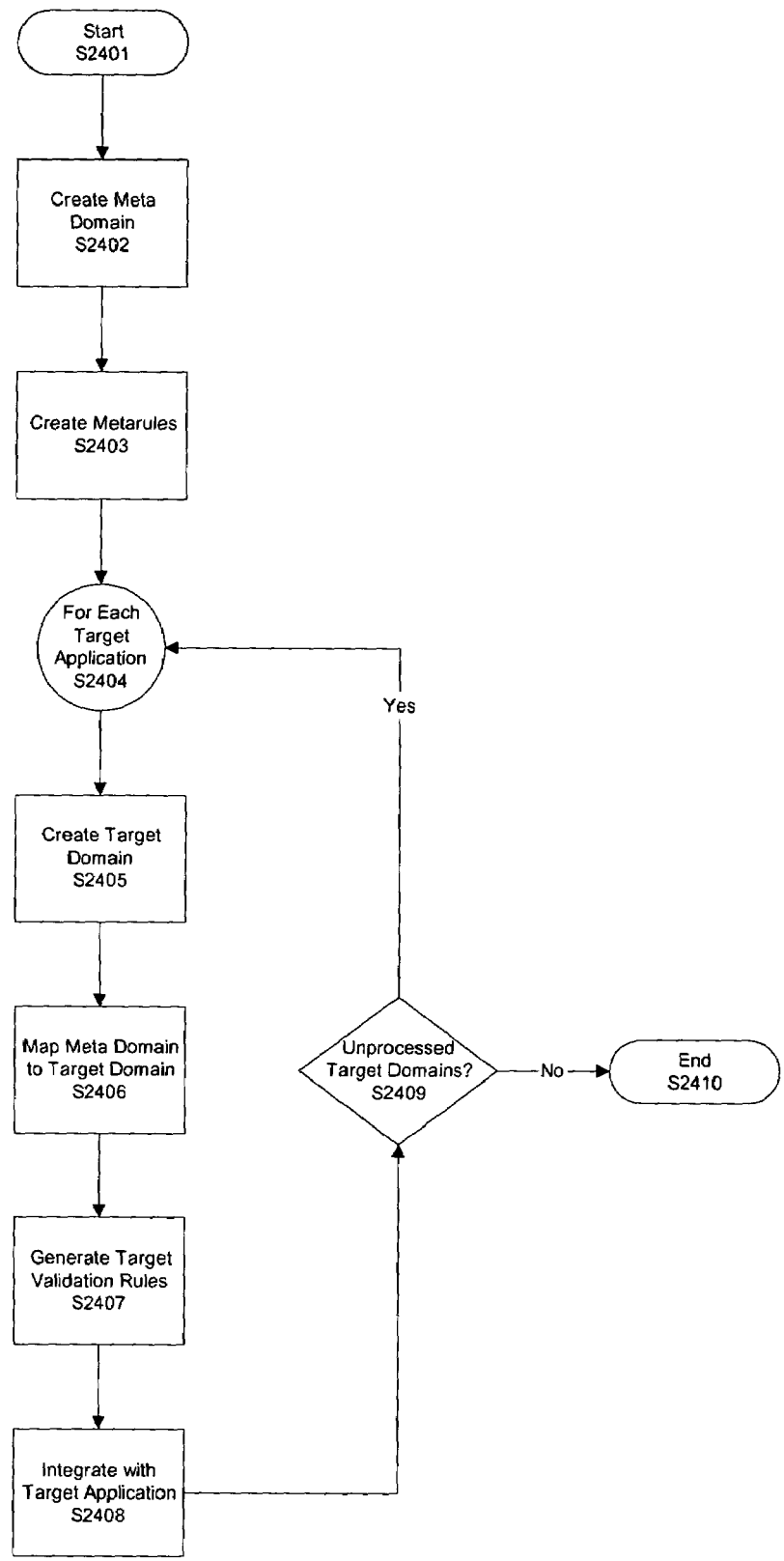
FIG. 24 is a diagram illustrating the process for using the system of the present disclosure within an enterprise according to one aspect of the system of the present disclosure.

FIG. 24 depicts how the system of the present disclosure can be utilized within an enterprise according to one aspect of the system of the present disclosure. Each meat domain and its associated mettles can be used to generate validation rules for multiple target applications within the enterprise. First a meat domain is created (Step S2402). Then the mettles associated with the meat domain are created (Step S2403). For each target application (Step S2404), a target domain is created (Step S2405). Next, the meat domain is mapped to the target domain (Step S2406). Then the target validation rules are generated (Step S2407) and integrated with the target application (Step S2408). Multiple meat domains could be created for different application domains within the enterprise. In that case, the above process would be repeated for each meat domain. It is even possible that a single target application could have multiple meat domains mapped to it, each generating validation rules for the target application.

Figure 25:
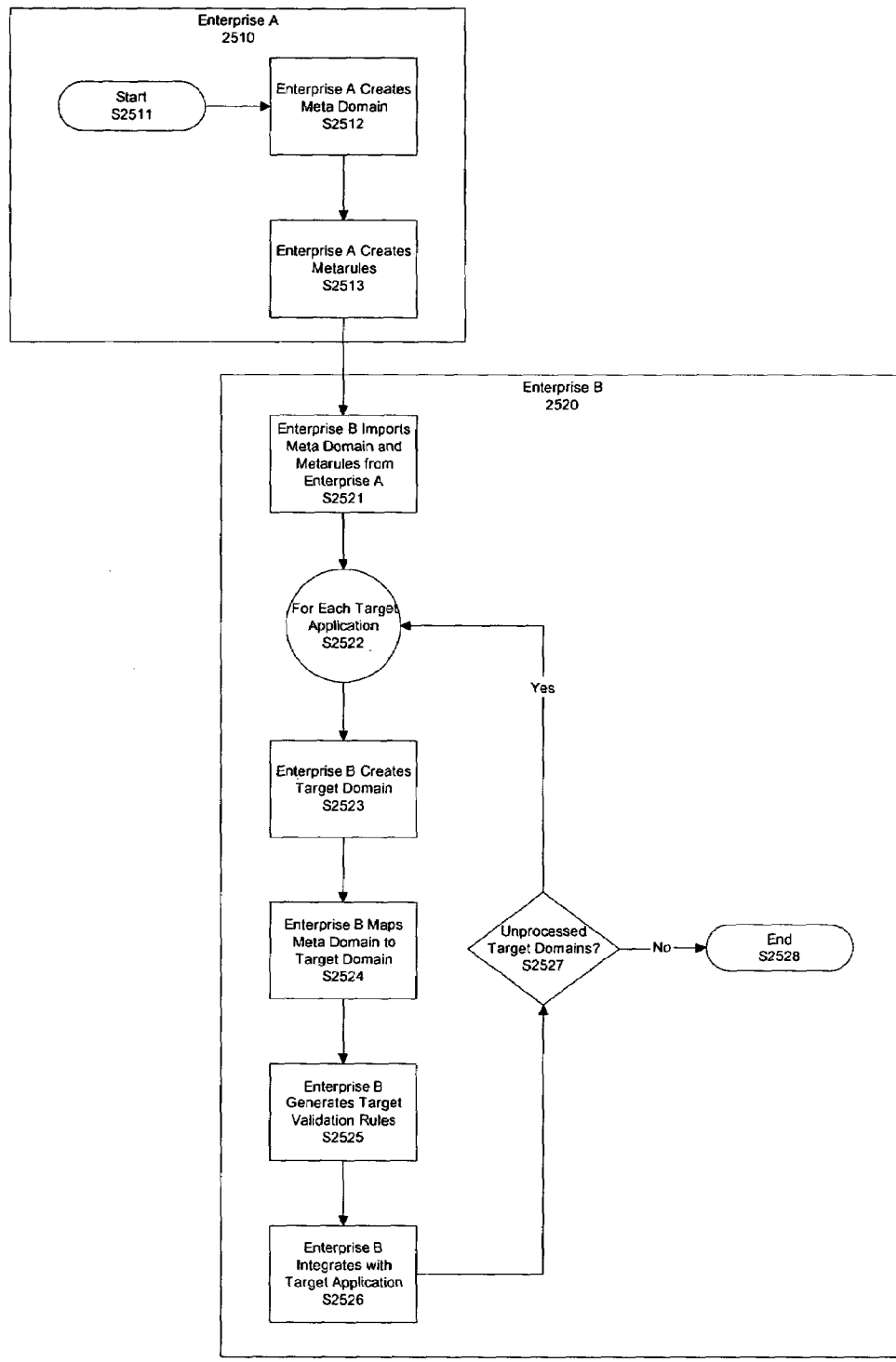
FIG. 25 is a diagram illustrating the process for using the system of the present disclosure between enterprises according to one aspect of the system of the present disclosure.

The system of the present disclosure can also be used between enterprises. An enterprise could import validation requirements from an external enterprise such as a standards body. Alternatively, an enterprise could export validation requirements to its business partners to promote standardization of validation logic. FIG. 25 illustrates a typical workflow for two organizations sharing validation logic according to one aspect of the system of the present disclosure. Enterprise A 2510 creates a meat domain (Step S2512) and mettles (Step S2513). Enterprise B 2520 imports the meat domain and mettles from Enterprise A 2510 (Step S2521). For each target application (Step S2522), Enterprise B 2520 creates a target domain (Step S2523) and maps the meat domain to the target domain (Step S2524). Finally, the target validation rules are generated (Step S2525) and integrated with the target application (Step S2526).

What is claimed is:

1. A method for generating validation logic executable in a target application in a target platform, comprising:
   creating a metarule; and
   automatically creating target domain metarule validation logic based on the metarule and a target language of the target platform.

2. The method of claim 1, wherein the metarule is one of required validation, length validation, data type validation, range validation, enumeration validation, regular expression validation, cross-attribute, aggregation, and conditional.

3. The method of claim 1, wherein the metarule includes data.

4. The method of claim 1, wherein the metarule includes logic.

5. The method of claim 1, wherein the metarule includes an error message.

6. The method of claim 1, wherein the target platform is one of ASCII files, C, C#, C++, COBOL, Java, Java script, RDBMS, Visual Basic, and XML.

7. The method of claim 1, wherein the metarule is imported from an external system.

8. The method of claim 1, wherein the metarule is exported to an external system.

9. The method of claim 1, further comprising:
   submitting test data, including a data value, to the target domain metarule validation logic; and
   producing an actual validation result based on the submitted test data.

10. The method of claim 9, further comprising:
    submitting an expected result; and
    comparing the actual validation result with the expected result.

11. The method of claim 1, further comprising:
    outputting the metarule in a text-readable format.

12. The method of claim 1, wherein the target domain metarule validation logic is generated for the metarule and contains logic to carry out the metarule.

13. The method of claim 1, wherein the target domain metarule validation logic is represented as a metarule validation function that receives a data value as input and outputs a violation detected.

14. The method of claim 1, further comprising:
    integrating the target domain metarule validation logic with the target application.

15. A method for generating validation logic executable in a target application in a target platform, comprising:
    creating a metarule;
    creating a target domain attribute;
    creating a mapping of the metarule to the target domain attribute; and
    automatically creating target domain attribute validation logic executable in a target application in a target platform based on the metarule, the mapping of the metarule to the target domain attribute, and the target language of the target platform.

16. The method of claim 15, wherein the target domain attribute has one of a name, data type, and description.

17. The method of claim 15, wherein the target domain attribute represents one of a) a variable in one of a C, C++, C#, Java, and Visual Basic application; b) one of an object property and variable in a Java script application; c) a data item in a COBOL application; d) a field in an ASCII File; e) a column in a relational database; and f) one of an element and an attribute in an XML file.

18. The method of claim 15, wherein the target domain attribute is input by a user.

19. The method of claim 15, wherein the target domain attribute is imported from the target application.

20. The method of claim 15, wherein the target domain attribute is imported from an external system.

21. The method of claim 15, wherein the target domain attribute is exported to an external system.

22. The method of claim 15, further comprising:
submitting test data, including a value of a target domain attribute, to the target domain attribute validation logic; and
producing an actual validation result based on the submitted test data.

23. The method of claim 22, further comprising:
submitting an expected result; and
comparing the actual validation result with an expected result.

24. The method of claim 15, further comprising:
outputting the target domain attribute and the mapped metarule in a text-readable format.

25. The method of claim 15, wherein the target domain attribute validation logic is generated for the target domain attribute and contains logic to validate the target domain attribute.

26. The method of claim 15, wherein the target domain attribute validation logic is in the form of a function and receives as input one of the target domain attribute and a value of the target domain attribute and outputs a violation.

27. The method of claim 15, further comprising:
integrating the target domain attribute validation logic with the target application.

28. The method of claim 15, wherein the metarule is associated with two or more target domain attributes.

29. The method of claim 15, wherein the target domain attribute is associated with two or more mettles.

30. The method of claim 15, further comprising:
creating a target domain entity from one or more target domain attributes; and
creating target domain entity validation logic executable in a target application in a target platform that validates the one or more target domain attributes in the target domain entity based on the target domain attributes contained in the target domain entity, the target domain attribute validation logic corresponding to the one or more target domain attributes, and the target language of the target platform.

31. The method of claim 30, wherein the target domain entity has one of a name and description.

32. The method of claim 30, wherein the target domain entity is one of a Java class, C struct, C++ class, C# class, Visual Basic class, Java script object, RDBMS table, COBOL data set, ASCII record, and XML element.

33. The method of claim 30, wherein the target domain entity is input by a user.

34. The method of claim 30, wherein the target domain entity is imported from the target application.

35. The method of claim 30, wherein the target domain entity is imported from an external system.

36. The method of claim 30, wherein the target domain entity is exported to an external system.

37. The method of claim 30, further comprising:
submitting test data, including values for the target domain attributes contained in the target domain entity, to the target domain entity validation logic; and
producing an actual validation result based on the submitted test data.

38. The method of claim 37, further comprising:
submitting an expected result; and
comparing the actual validation result with the expected result.

39. The method of claim 30, further comprising:
outputting the target domain entity and its associated target domain attributes in a text-readable format.

40. The method of claim 30, wherein the target domain entity validation logic is generated for the target domain entity and contains logic to validate the target domain entity.

41. The method of claim 30, wherein the target domain entity validation logic is in the form of a function and receives an instance of a target domain entity as input and outputs a violation.

42. The method of claim 30, further comprising:
integrating the target domain entity validation logic with the target application.

43. The method of claim 30, wherein the target domain entity is referenced by a target domain attribute belonging to another target domain entity.

44. The method of claim 30, further comprising:
creating a target domain from one or more target domain entities.

45. The method of claim 44, wherein the target domain is imported from an external system.

46. The method of claim 44, wherein the target domain is exported to an external system.

47. The method of claim 44, further comprising:
outputting the target domain and its associated target domain entities in a text-readable format.

48. A method for generating validation logic executable in a target application in a target platform, comprising:
creating a metarule;
creating a meat domain attribute;
associating the metarule with the meat domain attribute;
creating a target domain attribute;
mapping the meat domain attribute to the target domain attribute; and
automatically creating target domain attribute validation logic executable in a target application in a target platform based on the metarule, the meat domain attribute, the target domain attribute, the mapping between the meat domain attribute and the target domain attribute, the metarule associated with the meat domain attribute, and the target language of the target platform.

49. The method of claim 48, wherein the meat domain attribute has one of a name, data type, and description.

50. The method of claim 48, wherein the meat domain attribute is input by a user.

51. The method of claim 48, wherein the meat domain attribute is imported from an external system.

52. The method of claim 48, wherein the meat domain attribute is exported to an external system.

53. The method of claim 48, further comprising:
submitting test data, including a value of a meat domain attribute, to the target domain attribute validation logic; and
producing an actual validation result based on the submitted test data.

54. The method of claim 53, further comprising:
submitting an expected result; and comparing the actual validation result with the expected result.

55. The method of claim 48, further comprising:
outputting the meat domain attribute and the associated metarule in a text-readable format.

56. The method of claim 48, wherein the metarule is associated with two or more meat domain attributes.

57. The method of claim 48, wherein the meat domain attribute is associated with two or more mettles.

58. The method of claim 48, further comprising:
creating a meat domain entity from at least one meat domain attribute.

59. The method of claim 58, wherein the meat domain entity has one of a name and a description.

60. The method of claim 58, wherein the meat domain entity is input by a user.

61. The method of claim 58, wherein the meat domain entity is imported from an external system.

62. The method of claim 58, wherein the meat domain entity is exported to an external system.

63. The method of claim 58, further comprising:
submitting test data, including values for the meat domain attributes contained in the meat domain entity, to the target domain entity validation logic; and
producing an actual validation result based on the submitted test data.

64. The method of claim 63, further comprising:
submitting an expected result; and
comparing the expected result to the actual validation result.

65. The method of claim 58, further comprising:
outputting the meat domain entity and its associated meat domain attributes in a text-readable format.

66. The method of claim 58, further comprising:
creating a meat domain from one or more meat domain entities.

67. The method of claim 66, wherein the meat domain is imported from an external system.

68. The method of claim 66, wherein the meat domain is exported to an external system.

69. The method of claim 66, further comprising:
outputting the meat domain and its associated meat domain entities in a text-readable format.

70. A method for generating validation logic executable in a target application in a target platform, comprising:
receiving a metarule; and
automatically creating target domain metarule validation logic based on the metarule and a target language of the target platform.

71. A method for generating validation logic executable in a target application in a target platform, comprising:
receiving a metarule;
creating a target domain attribute;
creating a mapping of the metarule to the target domain attribute; and
automatically creating target domain attribute validation logic executable in a target application in a target platform based on the metarule, the mapping of the metarule to the target domain attribute, and the target language of the target platform.

72. A method for generating validation logic executable in a target application in a target platform, comprising:
receiving a metarule;
receiving a meat domain attribute associated with the metarule;
creating a target domain attribute;
mapping the meat domain attribute to the target domain attribute; and
automatically creating target domain attribute validation logic executable in a target application in a target platform based on the metarule, the meat domain attribute, the target domain attribute, the mapping between the meat domain attribute and the target domain attribute, the metarule associated with the meat domain attribute, and the target language of the target platform.

73. A method for generating validation logic executable in a target application in a target platform, comprising:
receiving a metarule;
creating a meat domain attribute;
associating the metarule with the meat domain attribute;
creating a target domain attribute;
mapping the meat domain attribute to the target domain attribute; and
automatically creating target domain attribute validation logic executable in a target application in a target platform based on the metarule, the meat domain attribute, the target domain attribute, the mapping between the meat domain attribute and the target domain attribute, the metarule associated with the meat domain attribute, and the target language of the target platform.

74. A computer storage medium embodying computer executable software code transmitted as an information signal, the code for generating rules executable in a target application in a target platform, comprising: code for creating a meat domain attribute; code for creating one or more mettles; code for associating the one or more mettles with the meat domain attribute; code for creating a target domain attribute; code for mapping the meat domain attribute to the target domain attribute; and code for automatically creating a target domain attribute validation function based on the meat domain attribute, the target domain attribute, the mapping between the meat domain attribute and the target domain attribute, the one or more mettles associated with the meat domain attribute, and the target language of the target platform.

75. A programmed computer system including a processor for executing a program for generating rules executable in a target application in a target platform, comprising: means for creating a meat domain attribute; means for creating one or more mettles; means for associating the one or more mettles with the meat domain attribute; means for creating a target domain attribute; means for mapping the meat domain attribute to the target domain attribute; and means for automatically creating a target domain attribute validation function based on the meat domain attribute, the target domain attribute, the mapping between the meat domain attribute and the target domain attribute, the one or more mettles associated with the meat domain attribute, and the target language of the target platform.

76. A system including a processor for generating rules executable in a target application in a target platform, comprising: a meat domain editor for creating a meat domain attribute and an associated metarule; a target domain editor for creating a target domain attribute and for mapping the meat domain attribute to the target domain attribute; and a target domain attribute validation function generator for automatically generating a target domain attribute validation function based on the meat domain attribute, the associated metarule, the target domain attribute, and the target language of the target platform.

* * * * *